US005992703A

United States Patent [19]
Fuchs

[11] Patent Number: 5,992,703
[45] Date of Patent: Nov. 30, 1999

[54] DISPENSER FOR DISCHARGING MEDIA

[75] Inventor: Karl-Heinz Fuchs, Radolfzell, Germany

[73] Assignee: Ing. Erich Pfeiffer GmbH, Radolfzell, Germany

[21] Appl. No.: 09/089,471

[22] Filed: Jun. 2, 1998

[30] Foreign Application Priority Data

Jun. 3, 1997 [DE] Germany ............ 197 23 134

[51] Int. Cl.[6] ............ B65D 88/54; G01F 11/06

[52] U.S. Cl. ............ 222/321.9; 222/385; 239/333

[58] Field of Search ............ 222/321.1, 321.7, 222/321.9, 383.1, 385, 190; 239/333

[56] References Cited

U.S. PATENT DOCUMENTS

| | | | |
|---|---|---|---|
| 4,179,049 | 12/1979 | Umstead | 222/631 |
| 4,438,871 | 3/1984 | Eckert | 222/137 |
| 5,096,094 | 3/1992 | Guilbert | 222/153 |
| 5,147,087 | 9/1992 | Fuchs | 239/333 |
| 5,209,376 | 5/1993 | Dirksing | 222/80 |
| 5,289,946 | 3/1994 | Fuchs | 222/38 |
| 5,289,952 | 3/1994 | Gueret | 222/189 |
| 5,326,000 | 7/1994 | Fuchs | 222/321 |
| 5,348,189 | 9/1994 | Cater | 222/1 |
| 5,692,650 | 12/1997 | Wolter et al. | 222/321.9 |
| 5,779,104 | 7/1998 | Reidel | 222/190 |
| 5,791,518 | 8/1998 | Amann et al. | 222/38 |

FOREIGN PATENT DOCUMENTS

| | | |
|---|---|---|
| 1 653 651 | 7/1971 | Germany . |
| 3722469 A1 | 1/1989 | Germany . |
| 4035688 A1 | 5/1992 | Germany . |
| 4207800 C1 | 9/1993 | Germany . |
| WO 97/13585 | of 0000 | WIPO . |

OTHER PUBLICATIONS

German search report in Appln. No. 197 23 134.9, dated Nov. 21, 1997.
European Patent Office search report on European patent application No. 98 109 320.6, dated Apr. 8, 1999.
Japanese Patent Abstract, K. Hiroshi, Publication No. 63151370, published Jun. 23, 1988 for "Distribution Apparatus."

*Primary Examiner*—Kevin P. Shaver
*Assistant Examiner*—Keats Quinalty
*Attorney, Agent, or Firm*—Charles & Brady LLP

[57] ABSTRACT

For a medium pump (3) a mountable air pump (4) is provided. The stationary pump body (49) of pump (4) is fixedly connected to a member (8) provided for fixing the medium pump (3) to a reservoir (2). During the operating stroke a pressure chamber (50) of the air pump (4) permanently communicates with the reservoir (2) via the pump casing (15). Thereby pressure equalization is achieved. One and the same medium pump (3) can be provided with or without the air pump (4). When equipped with the air pump (4) the discharge of highly viscous media is significantly facilitated.

29 Claims, 2 Drawing Sheets

DISPENSER FOR DISCHARGING MEDIA

TECHNICAL FIELD AND BACKGROUND OF THE INVENTION

The invention relates to a media discharge device, like for flowable media such as gaseous, powdery, liquid, pasty and/or similar media, which can be conveyed and expelled by pressurization or with the aid of a delivery flow including a second medium.

Highly-viscous media, such as creamy, pasty or other media which are non-flowable or only viscously flowable under their own weight and which may be free of alcoholic solvents or the like permit dispensing in small quantities only with great difficulty when e.g. the nozzle passage discharge to the environment has a width of less than two, one or half a millimeter or when the medium needs to be dispensed atomized from the dispenser. To facilitate discharge a second pump can be used to convey an aggregate or carrier medium, applied to the first medium in the outlet duct of the unit or directly at the inlet end of the nozzle end duct. In this arrangement the second medium, for example air, is delivered to the environment expediently in a volume many times higher but at a pressure many times lower than that of the first medium together therewith through the medium orifice or nozzle passage.

For optimum dosed discharge, media differing in particular in their viscosity require dispensers or pump units having differing performance features. Especially the ratio defined by each unit of travel or velocity of the pumping stroke relative to the delivery volumes and the delivery pressures of the two pumping units that needs to be adapted to the flow properties of the medium in each case. For this purpose it may be sufficient to vary the performance features of only one of the two pumping units by a differing design configuration or to leave out this pumping unit completely, whilst the other pumping unit is permanently formed by the same pump which is preassembled ready for operation prior to being connected to the second pumping unit. This is to be understood that this pump comprises in the prefabricated condition two pumping units guided precisely against each other for producing the pressure in a pump chamber. In the case of a plunger pump this involves a pump body and a plunger unit slidable therein, guided at two locations located axially spaced away from each other free of tilt and diametral clearance at or exclusively within the pump body.

Accordingly, by actuating a plunger guided in this way such a pump may also be used to discharge the medium from the pump chamber through the plunger and, where necessary, subsequently suctioned from a reservoir into the pump chamber if the pump is not combined with a pressurizing chamber of the second pump. If for this purpose only one plunger having the shape of a flat ring and having sealing lips, secured directly to the pump body of the first pump is omitted the design in supporting this plunger becomes relatively complicated.

Furthermore, in this arrangement the inner width of the discharge head to be arranged on the plunger and requiring manual actuation always needs to remain the same should the discharge head need to tightly clasp the outer circumference of the first pump body.

OBJECTS OF THE INVENTION

An object of the invention is to provide a dispenser obviating the drawbacks of prior art dispenser or as described. A further object is to provide simple means for optionally including a second pump or not.

SUMMARY OF THE INVENTION

A pump element of the second pump provided for connection with the first pump casing substantially stationary with respect to the direction of the pump stroke can be optionally inverted over the first pump when preassembled ready for operation as above described. So the pump element protrudes into the actuator head and guides or centers the latter relative to the first pump body. This guidance is provided continuously in the resting position, the end position of the stroke or in all positions located inbetween. It may be achieved at both an outer and inner circumference of the actuator head with or without diametral motion play. The first pump element of the second pump forms an optionally fitted assembly body which may be replaced by another one which is fixed by the same holding means but contains no pump element.

The first pump casing comprises a downstream end section or a body end which bounds by its central body chamber directly a passage for emerging the actuator plunger from this body end. This end section forms the downstream outermost end face of the pump body and extends in one part over either at least a third respective half of the overall length of the second pump body or is formed by a separate body cover annular in cross-section extending at the most over a third or half of the overall length of the first pump body. The pump body comprises an annular face for supporting the medium reservoir or the like. This support can be provided at the end face surrounding the reservoir opening and/or at the inner or outer circumferential face of the neck of the medium reservoir adjoining the end face. This support face is formed by a component separate from the axially oblong assembly body. The latter can extend upstream beyond the support face and may have a length which is greater than half or two-thirds of its largest width.

Relative to the pump body, fastening member or reservoir neck the assembly body can be tensioned. Thereby a radial and/or axial tension may be provided as resulting for instance from a press fit, a snap-action connection, a threaded connection, a crimp ring or the like. The holding means may include a seal with which the body chamber of the first pump casing and the pressure chamber of the second pump is sealed from the atmosphere except for an inlet into this pressure chamber. This inlet can be formed exclusively by the outlet duct or the nozzle orifice of the medium outlet. Thereby the inlet has a minimum diameter corresponding maximally to the aforementioned nozzle width. The spring-controlled return motion of the dispenser into the resting position is thereby damped and the viscous medium is reliably sucked into the first pump. Also the media nozzle is cleaned of medium debris by the return air flow.

Further advantages are achieved when the pressure chamber of the second pump is duct-connected with the chamber of the first pump casing at least directly on commencement of the pump stroke and continually up to the return into the resting position via the passage for the plunger and via the first chamber with the reservoir space. Thereby, during the pump stroke, part of the air able to flow back into the pressure chamber during the return stroke is forced from the pressure chamber into the medium reservoir, as a result of which the cited damping effect is reduced. The air does not gain access to the first pump chamber, but instead only the length section of the casing space which connects downstream directly to the sealing point of the piston of this pump. In the resting position the air duct connection traversing the first pump casing can be shut by a valve. So the reservoir chamber is hermetically sealed from the environment. The overpressure created in the reservoir by the second pump also facilitates delivery of the medium into the first pump.

To prevent detachment of the actuating head releasably mounted on the actuating plunger, the assembly body forms an anti-detach or stop means against which a counter-stop of the actuator head abuts in the resting position under the force of the return spring. This single integral return spring of the dispenser is located totally within the first pump casing and acts on the plunger slidably located in this pump body or on a valve element of an outlet valve traversing this plunger.

BRIEF DESCRIPTION OF THE DRAWINGS

Example embodiments of the invention are explained in more detail in the following and illustrated in the drawings in which.

SUMMARY OF THE INVENTION

Figure 1:
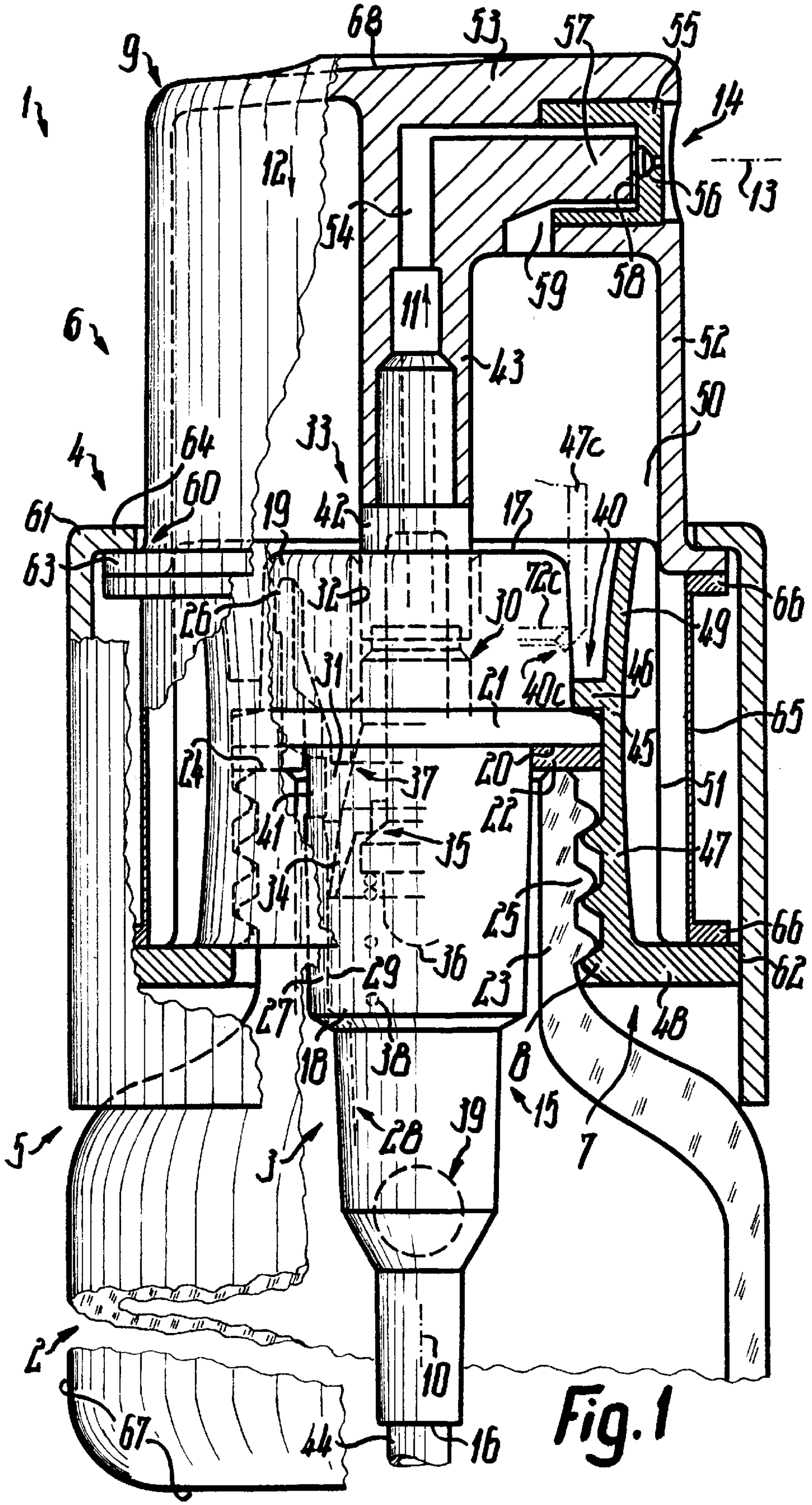
FIG. 1 is a partial axial view showing a dispenser in accordance with the invention in the resting position and FIG. 2 is an illustration corresponding to that of FIG. 1 showing further embodiments differently equipped left and right side.

The dispenser 1 serves to be fixed to a reservoir 2, namely a flask so that the unit formed thereby can be clasped, carried and simultaneously actuated to discharge the medium single-handedly. For delivering the first medium from reservoir 2 a first pump unit 3 is provided. For delivering the second medium, namely air, a second pump unit 4 is provided which surrounds the first pump unit or pump 3 as well as the reservoir 2 over part of the length thereof. Both pumps 3, 4 are commonly and simultaneously actuated by two in each case common actuating units 5, 6 shifted relative to each other under shortening of the device 1. Unit 5 comprises reservoir 2, an assembly body 7 and a fixing member 8 fixing a base body or casing of pump 3 to reservoir 2 free of play but releasable without destruction. Unit 6 comprises a discharge and actuator head 9 which is freely exposed and forms the downstream end of device 1, the upstream end of which is formed by the bottom of reservoir 2. All of the cited components are located coaxially relative to each other in a central axis 10. Pump unit 3 passes flow of the first medium parallel to axis 10 in direction 11 to head 9 which in turn is to be moved manually in the opposite direction 12 from the resting position by a working or pump stroke and then returned in direction 11 by spring force into the resting position.

Head 9 comprises the media outlet 14 at which the two media are environmentally released from device 1 in atomized form. The outlet axis is oriented at right angles transverse to axis 10. Pump 3 comprises a first pump casing 15 freely protruding with the majority of its length into reservoir 2 and forming an upstream inner end 16 located within reservoir 2 as well as a downstream outermost end 17 outside of reservoir 2. End 17 is permanently surrounded by the body 7 and by head 9. Casing 15 is formed by only two casing parts axially interconnected, namely a longer casing part 18 and a shorter casing part 19 forming the end 17 and located totally outside reservoir 2. The outermost circumference of cover 19 adjoining end face 17 forms the corresponding end section of the outermost circumference of the entire casing 15. Protruding beyond this outer circumference of casing 15 is a flat ring shoulder or support face 20 facing end 16. Face 20 is formed by the end face of a radially protruding annular flange 21 of cover 19 and is supported axially tensioned and sealed optionally by interpositioning an annular seal 22 at the end face 24 of reservoir neck 23. Neck 23 is constricted relative to the reservoir flask axially in direction 12 adjoining reservoir neck 23. Neck 23 surrounds the reservoir opening by annular end face 24. From face 24 body 18 protrudes through neck 23 into the flask without contact therewith. For mutually tensioning the faces 20, 24 neck 23 comprises at the outer circumference a counter-member, which in this case is a male thread 25.

Body sections 18, 19 are non-releasably connected to each other by a connection or snap connection 26 fully located within cover 19. Connection 26 is provided at the downstream end of casing jacket 27. Cover 19 tightly surrounds the jacket 27 at the outer circumference and inner circumference up to face 20, thereby protruding into jacket 27 by a lug in direction 12 and totally covers the end of jacket 27 at the outer circumference. From end 16 up to end 17 casing 15 bounds a casing space 28 traversing ends 16, 17. From end 16 up to cover 19 space 28 is bounded by the inner circumference of jacket 27 and subsequently thereto up to end 17 by the inner circumference of the inner projection of cover 19. The outer circumference of integral jacket 27 freely adjoins the reservoir space and seal 22. Space 28 forms individual spaces interconnected in the longitudinal direction, namely an upstream pressure or pump chamber of pump 3 and downstream adjacent thereto an air chamber 31 which is permanently vacant of the first medium. This chamber continues in a central passage 32 of casing section 19 up to end 17. Chambers 29, 31 are sealingly separated from each other by a piston unit 30 belonging to unit 6. The actuator 33 thereof traverses passage 32 radially guided. Pump piston 34 separates chambers 29, 31 from each other by its sealing lips sliding on jacket 27.

The downstream end of chamber 29 located within piston 34 is formed by the valve seat of an outlet valve 35 closed in FIG. 1. Valve 35 opens due to overpressure in chamber 29 or due to axial abutment of plunger lip 34 inside body 15, whereby plunger sleeve is lifted off from the valve seat under resilient compression. This seat is formed by a core body 36 traversing the shell-shaped and integral piston body. Core body 36 and the piston body bound entirely within actuator 33 a first longitudinal section of an outlet duct for the first medium. The downstream, sleeve shaped end of the elastic piston body and the corresponding end of core body 36 are inserted firmly seated in direction 11 into the corresponding end of actuator 33.

Downstream of valve 35 and within casing 15 a further valve 37 is provided. The movable valve element of vent valve 37, like of valve 35, is formed by a conical section of the piston body. The valve seat is formed by the upstream end of the inner projection of cover 19 or of passage 32. Coming into contact with this valve seat in the initial position is the outer circumference of the piston body. So the connection between passage 32 and the upstream section of chamber 31 is interrupted. To return units 5, 6 or valves 35, 37 into the resting position and thus to close valves 35, 37 a sole spring 38 is provided exclusively within chamber 29. The upstream end of spring 38 is supported inside casing 15 and the downstream end thereof on body 36. Compression spring 38 is permanently axially pretensioned. The pressure chamber 29 extends upstream up to an inlet valve 39 located within body section 18 and including a spherical valve body which is free of spring loading. Under underpressure in chamber 29 this valve body opens towards the reservoir space and closes under overpressure. End 16 is located upstream of valve 39. Chamber 31 is permanently connected to the reservoir space via a port 41 located adjacent to valve

37 in direction 12. The axially slot-shaped vent port 41 traverses jacket 27 only in the vicinity of chamber 31 and adjoins approximately the support face 20. Port 41 thereby issues into the annular gap between neck 23 and the jacket 27.

Actuator 33 is formed by two axially interconnected, dimensionally rigid tappet sections 42, 43 disconnectable from each other without destruction. Section 42 belongs to piston unit 30, is permanently radially guided in passage 32 and receives the corresponding ends of piston body 34 and core body 36. Section 43 inserted in direction 12 over a constricted end section of section 42 is in one part with cap-shaped head 9 and gains access into passage 32 on the working stroke. When head 9 is actuated in direction 12 the volume of chamber 29 is diminished and the first medium contained therein is conveyed under pressure through opened valve 35 into actuator section 42 as well as from the end thereof into section 43 and into head 9. On release of head 9 from actuating force spring 38 firstly closes valve 35, then moves unit 6 back into the resting position and on the latter closes valve 37. During return stroke the first medium is subsequently sucked via opened valve 39 from reservoir 2 into the enlarging chamber 29 via a flexible riser 44. Tube 44 is inserted through end 16 into casing 15 in direction 11. During forward and return stroke, while valve 37 is open, air is able to flow through the passage 32 from outside of pump 3 through port 41 into the reservoir space or in the reverse direction from reservoir space to cause pressure equalization in the reservoir space.

With means 40 casing 15 and body 7 are positionally locked both radially and axially relative to each other as well as relative to reservoir 2. So body 7 and body section 19 freely protruding in direction 11 form together a stationary pump element of unit 4, 5, namely a displacement piston. Element 7 comprises a hermetically sealed jacket 45 surrounding body section 19 and neck 23 radially spaced away therefrom over the full length in each case. Protruding beyond the inner circumference of jacket 45 with a spacing between its ends is a flat ring-shaped projection 46 located between two longitudinal sections 47, 49 of jacket 45. Jacket section 47 adjoining projection 46 upstream forms the inner circumference of fixing member 8, namely a female thread engaging counter-member 25 or, optionally, an annular shoulder axially tensioned to engage a counter-shoulder of neck 23 so that support face 20 is tensioned against face 24. Adjoining the corresponding end of jacket section 47 or of fixing member 8 spaced away upstream from lug 46 is an end wall 48 protruding only beyond the outer circumference. This end wall is an annular disc. In direction 11 adjoining projection 46 is the shorter jacket section 49. Section 49 may extend beyond end 17 or be conically widened in direction 11.

Up to projection 46 body part 19 and the inner and outer circumference of section 49 are located in a pressure space of pump 4. This space extends into head 9. Upstream of lug 46 merely the outer circumference of jacket 47 adjoins this pressure space 50 which extends from end wall 48 up to the end wall 53 and is annular full-length. Space 50 extends further from end 17 permanently up to valve 37 and, when valve 37 is open, into chamber 31, port 41 and the reservoir space.

Lug 46 contacts with its corresponding end face the end side of the annular bead 21 facing end 17. By its inner circumferential face lug 46 directly contacts the outer circumference of body part 19. In each case this sealing contact is axially or radially pretensioned. So the pressure space 50 is permanently sealed off pressure-tight to the environment at this point. A corresponding axially offset seal may also be formed by contact of the inner circumference of section 47 with the outer circumference of flange 21 or of seal 22 and by contact of member 8 with counter-member 25. So a multiple seal like a labyrinth seal is achieved. At the outer circumference of jacket 45 head 9 is guided by its inner circumference with zero diametral clearance. For this axial ribs 51 protrude beyond this outer circumference and extend over the full length of jacket 45 up to the wall 48. The edge faces of ribs 51 form the guiding faces. Between adjacent ribs 51 air can be permanently exchanged between the two length sections of pressure space 50, namely between the section located in head 9 and the section surrounding jacket 45. Portions 45 to 49 and 51 of body 7 are commonly in one part. From end 16 up to end 17 casing 15 is dimensionally rigid. Reservoir 2, body 7 and head 9 are likewise dimensionally rigid.

Cap-shaped head 9 comprises a cap shell 52 freely jutting from a wall 53 exclusively in direction 12. This cap shell spacingly surrounds actuator 33, it thus together with the latter defining the corresponding end part of pressure space 50. Actuator section 43 made in one part with walls 52, 53 is penetrated by an outlet duct 54 adjoining actuator section 42 and the duct section thereof. Duct 54 serves for the first medium only and is guided to outlet 14 by a duct section angled parallel to axis 13. A nozzle duct 56 constricted in flow direction traverses the integral end wall of a cap-shaped nozzle body 55 located in axis 13. Body 55 is inserted firmly seated in an annular opening of wall 53 with its cap shell forward and counter to the flow direction. At the outer end of duct 56, namely at the nozzle orifice the medium leaves the device 1. A nozzle core 57 in one part with wall 53 engages nozzle cap 55 inside. Between the core end face and the inner end face of the end wall of nozzle cap 55 a vortex or swirl chamber 58 is formed. In chamber 58 the medium is caused to rotate about axis 13 and is thus directly output into the duct 56.

Nozzle 14 is located in a region of end wall 53 which is thickened axially in direction 12 only over a partial circumference. A further passage 59 traverses this region. Duct 59 is connected to pressure chamber 50 by traversing the inner end face of wall 53 in the vicinity of the connection between actuator 33 and the inner end of nozzle body 55 before then being lead therefrom at an angle and with constriction likewise to mixing chamber 58. Within the nozzle body 55 ducts 54, 59 are bounded by the inner circumference of the cap shell as well as by the outer circumference of nozzle core 57. Plural, e.g. three separate ducts distributed over the circumference may be lead from duct 54 into chamber 58 and relative thereto, fewer passages 59, e.g. only a single one are provided. Duct 59 is run through towards outlet 14 when compression chamber 50 is emptied or constricted as well as in the counter direction when chamber 50 is filled or enlarged since it is non-valved or permanently open to flow.

To prevent head 9 from withdrawal from piston unit 30 and actuator part 42 a positive-acting return lock 60 is provided directly between head 9 and body 7. The upstream end of shell 52 forms a collar 63 or stop of annular disc shape protruding beyond the outer circumference of the shell. Stop 63 is clasped by a corresponding counter-stop of a sleeve-shaped cover body 61. Body 61 surrounds by its shell jacket 45 inclusive wall 48 with radial spacing over their full length and extends up to the outside of the transition between neck 23 and reservoir bulge. The inner circumference of this shell jacket is connected via a connection 62 directly to the outer circumference of the end wall 48. This connection 62 may be made by a bond or weld, a snap connection or an integral connection when body 61 is not a component separate from but integral with jacket 45. The downstream end of body shell 61 is angled toward axis 10 to form an annular disc forming a counter-stop 64 and extending approximately up to the outer circumference of shell 52. In FIG. 1 stops 63, 64 contact each other, whereby the resting position of device 1 can be secured. On beginning the pump stroke stop 63 is lifted off from stop 64.

Between head 9 or end 63 of shell 52 and body 7 end formed by end wall 48 pressure chamber 50 is sealingly closed at its outermost circumference by a flexible bellows 65. Bellows 65 is sealingly held by annular discs or flanges 66 directly on end wall 48 and on the upstream end face of shell 52 by one of the fasteners as explained with respect to connection 62. Bellows or sleeve 65 surrounding guide 51 without contact may be a thin film of plastics material tensioned axially taut, for example in the form of a bag which is folded on being shortened by the pump stroke, until, in case, flanges 66 are in contact with each other. Dimensionally rigid flanges 66 may be in one part with the bellows 65 and protrude only beyond the outer circumference thereof, for example up to the outer circumference of collar 63. Bellows 65 may also be formed, however, by a folded bellows prefolded like a concertina in axial coss-section and in the resting position. Instead of the shortenable chamber closure 65 shell 52 could also carry or integrally form in the vicinity of collar 63 a piston sealingly sliding on the inner circumference of body 61. There connection 62 would be pressure-tight.

The common stroke of both pumps 3, 4 may be so large that at the end of the pump stroke the downstream end face of body 7 almost comes up against the inner side of the thickening of end wall 53. Then flanges 66 are still spaced from each other. For manually implementing the operating stroke the outer circumference of cover housing 61 and that of reservoir bulge or the bottom thereof form one handle 67 and the downstream end face of head 9 or end wall 53 form the other handle 68, namely a pressure face for a finger of the same hand also gripping handle 67. On start of the stroke both chambers 29, 50 are volumetrically diminished and valve 37 is instantly opened. Therefore air immediately flows from chamber 50 during the entire stroke through duct 59 out of outlet 14 as well as, depending on the pressure conditions, via passage 32 into reservoir 2 or out thereof to duct 59. It is not until valve 35 openes that the medium too, flows from chamber 29 through duct 54 into chamber 58 where it is mixed uniformly with the second medium and discharged from outlet 14 as a swirled or sprayed cone.

On starting return stroke or closing valve 35 flow of the first medium from chamber 29 is interrupted whilst air flow from opening 14 via the duct 59 may continue until pressure in the chamber 50 or in reservoir 2 has dropped to atmospheric pressure. Since from this moment during the further return stroke this pressure drops further, air is then sucked exclusively via outlet 14 and duct 59 into chamber 50. At the same time, the medium is sucked from reservoir 2 into chamber 29 followed by an air flow into reservoir 2. This continues until the resting position is achieved or valve 37 is closed and is then terminated. Device 1 is then ready for a further media discharge. By varying the actuated stroke speed the quantity ratio of the two media in the discharge jet can be continuously varied at any time.

Pump 3 may also be fixed by a simple fastening cap to reservoir neck 23. This cap may comprise e.g. merely lug 46 and section 47, i.e. not require sections 48, 49, 51. In this case in which pump 4 is not provided a head 9 is employed, the shell 52 of which does not include collar 63. For fitting pump 3 bodies 7, 9 may be preassembled to an assembly unit. For this either head 9 is caused to snap into place in direction 12 into body 7, 61 with mutual radial as well as flexible yielding of collars 63, 64. Or body 9 is inserted first in direction 11 into body 61 and then body 7 is likewise inserted in body 61 in the same direction to make connection 62. This unit then also contains bellows 65. In addition, this assembly unit may also include pump 3 which is to be inserted in direction 11 into body 7 until it comes into contact with lug 46. This assembly unit can then be inverted over neck 23 and tensioned in place by members 8, 25. It is, however, also conceivable to insert pump 3 first into reservoir 2 before fitting or mounting the remainder of the assembly unit in direction 12. Thereby the plug-in connection between actuator sections 42, 43 is set up.

Figure 2:
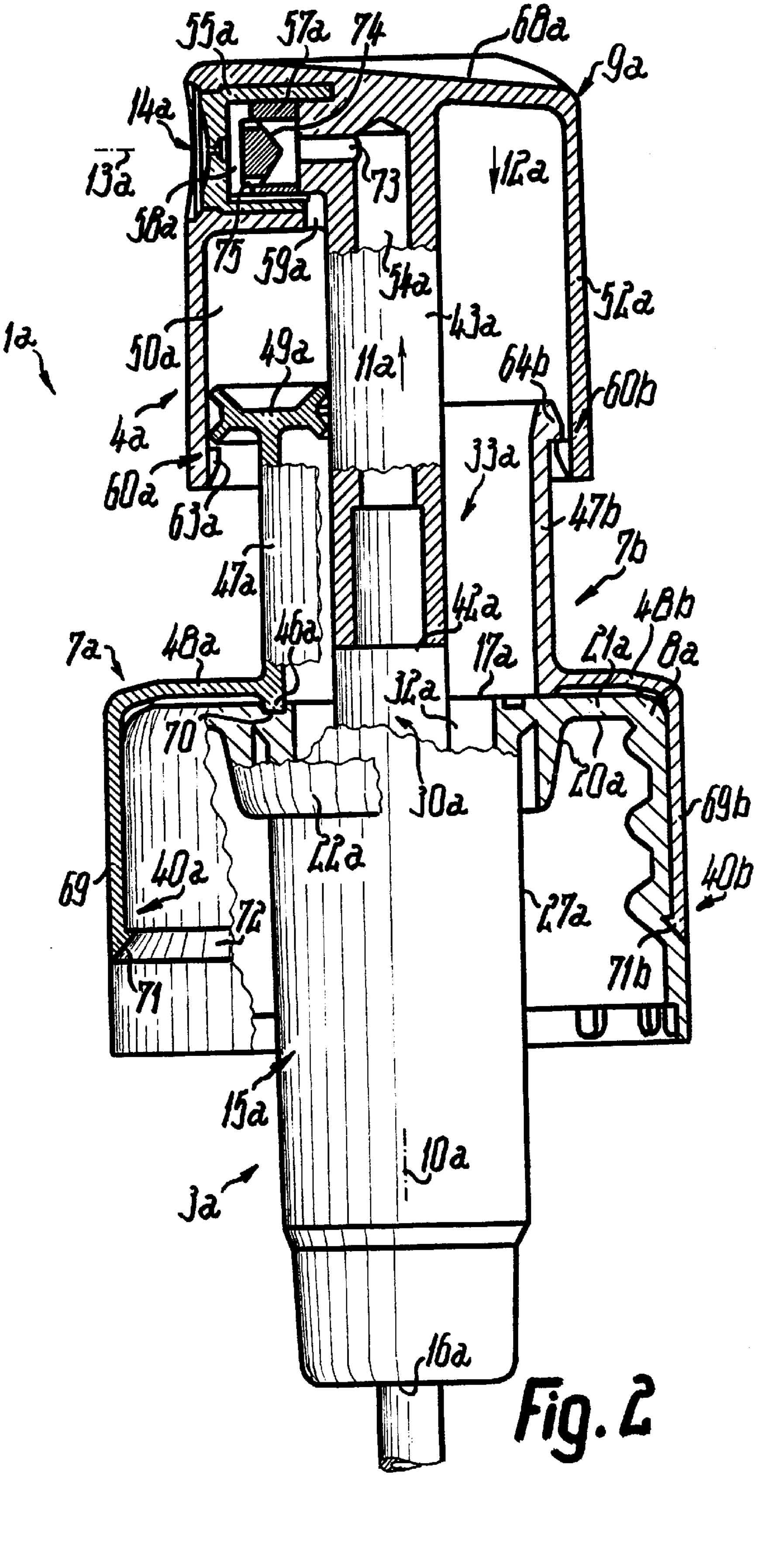

In FIG. 2 like reference numerals as used in FIG. 1 relate to like components but include index a. The description of the one embodiment applies accordingly also to the other, i.e. each feature of the one embodiment can also be provided in the other.

With device 1*a* cap-shaped fixing member 8*a* commonly with casing 15*a* forms a rigidly preassembled or are one part snap respective thread connector cap for fixing reservoir (not shown). Cap end wall 21*a* extends in direction 11*a* only up to end face 17*a* which in this case is in one part with jacket 27*a* up to the pump chamber respective inclusive the sliding face for the pump piston or up to end 16*a*. By its inner side end wall 21*a* also forms support face 20*a* as well as seal 22*a* protruding in direction 12*a* beyond face 20*a*. Seal 22*a* surrounds jacket 27*a* with radial spacing as an annular rim and is located within the internal thread of member 8*a*. Seal 22*a* may protrude into the reservoir neck and come into contact with the inner circumference thereof with radial pressure. Seal 22 is in one part with member 8*a* and jacket 27*a*. In this case piston unit 30*a* is tiltlessly guided at the inner circumference of jacket 27*a* by two separate individual pistons axially spaced from each other. The piston located nearer to head 9*a* may diametrically be larger than the piston bounding the pressure chamber and may also include a piston lip freely protruding in direction 12*a* guided on jacket 27*a*. Past the piston lip of this downstream piston venting of the reservoir space occurs during the pump stroke. Both pistons commonly with the actuator section 42*a* can be in one part. Thus, only the downstream closure piston and not section 42*a* is guided inside passage 32*a* directly on jacket 27*a* to prevent radial motions.

Jacket 47*a* protrudes from end 17*a* and end wall 21*a* in direction 11*a* so that it directly surrounds actuator sections 42*a*, 43*a* and permanently protrudes into shell 52*a*. At the downstream end jacket 47*a* forms piston 49*a* in one part. Piston 49*a* slides sealed by sealing lips on the inner circumference of jacket 22*a* and on the outer circumference of section 43*a*. At both the outer circumference and the inner circumference piston 49*a* of flat annular cup shape forms in each case two sealing lips freely opposingly projecting in the form of obtuse angled cones for guidance on head 9*a* and actuator 33*a*. End wall 48*a* and the upstream end of jacket 47*a*axially directly support on end 17*a*. End 17*a* is smooth throughout up to the outer circumference of body 8*a*. For this lug 46*a* projects axially beyond the inside of wall 48*a* as an extension of jacket 47*a*. Lug 46*a* sealingly engages inside a depression 70 of end face 17*a* with axial and radial pressure. Annular or groove-shaped depression 70 is open only in direction 11*a* and is located directly radially adjacent to and outside of the passage 32*a*. Members 46*a*, 70 may also be snap members which positively positionally lock body 7*a* to prevent withdrawal in direction 11*a*. The space within jacket 70 may be sealed to the outside or serve to vent the reservoir.

At the outermost circumference wall 48*a* passes into a cap shell 69 freely projecting only in direction 12*a* and supporting against the outer circumference of the cap shell of member 8*a* with radial tension upon by its inherent spring forces. Shell 69 comprises at its upstream end a holding or snap member 71 protruding beyond its inner circumference. Means 40*a* include member 71 positively, radially pretensioned and sealingly engaging a counter member 72, namely a circumferential groove in the jacket of member 8*a*. Thus annularly web shaped holding member 46*a* is urged into depression 70. Pump 3*a* can be fixed to the reservoir by fixing member 8*a*. Thereafter body 7*a* is inverted and before or after that head 9*a* is fixed.

Prevention means 60*a* are provided on the inner circumference of shell 52*a* forming stop 63*a* in one part, namely circumferentially distributed cams or continuously annular projection. Against this stop 63*a* piston 49*a* can directly abut only by the piston lip which slides on shell 52*a* and is conically widened in direction 12*a*. Jacket 47*a* connects to piston 49*a* in the middle between the outer and inner circumferences thereof, namely to a center section of annular disc shape. At the inner and outer circumference respectively the center section passes into two separate piston lips. Head 9*a* may be preassembled with body 7*a* before being mounted on the pump unit 3*a* and cap 8*a*.

As evident from the right-hand side of FIG. 2 piston body 7*a* may be replaced by a body 7*b* having no piston. The jacket 47*b* of body 7*b* may be larger in diameter than jacket 47*a*, supported radial outside of depression 70 on end 17*a* and forming at the free end stop 64*b* projecting beyond its outer circumference to provide a snap member. Body 7*b* is fixed by means 40*b* which are configured the same as means 40*a*. Snap member 71*b* engages groove 72. End wall 48*b* and shell 69*b* correspond to walls 48*a*, 69. Body 7*b* can be fixed like body 7*a*.

As apparent by the dot-dashed indication on the right-hand side of FIG. 1 jacket 47*a* can be fixed by its upstream end also directly to the outer circumference of body section 19 by means 40*c*. Counter member 72*c* is located between and spaced from both the end 17 and flange 21. Jacket 47*c* does not project in direction 12 over flange 21. Snap member engaging groove 72*c* is in one part with jacket 47*c* and protrudes only beyond the inner circumference thereof. Head 9 is able to internally receive section 19 during the stroke. Similar to FIG. 2 jacket 47*c* forms in the resting position an outermost protective shell totally covering actuator 33*a* between the actuator head and the first pump and freely accessible at its outside.

The discharge nozzle of head 9*a* comprises an annular core body 57*a* separate from body 55*a* and head 9*a*. In the axis 13*a* of this body 57 a transverse duct 73 issues against an impact face 74. Duct 73 connects to axial duct 54*a*. Baffle 74 is located within a prechamber located inside the annular space of body 57*a*. Face 74 opposes the outlet port of duct 73. Face 74 protrudes counter flow direction as an obtuse angled cone and extends up to the inner circumference of the annular section of body 57*a*. This inner circumference together with face 74 bounds the prechamber widened relative to duct 73. Adjoining this inner circumference, nozzle ducts 75 are distributed about axis 13*a*. Ducts 75 are oriented parallel to axis 13*a* or inclined therto in radial view. Ducts 75 connect the prechamber to mixing chamber 58*a* and traverse face 74. Face 74 is entirely closed radially inside from this crest of ducts 75, namely formed by an inner core made in one part with the annular section. This inner core projects in flow direction beyond the annular section into the mixing chamber but extends counter the flow direction only over part of the length of the annular section. Through these ducts 75 separate atomized spray jets are emitted into mixing chamber 58*a* where they are first mixed with air from pump 4*a* before then being again atomized on leaving the nozzle duct. The jets can emerge from ducts 75 radially outwards against the inner circumference of the mixing chamber 58*a*.

For fitting, bodies 55*a*, 57*a* may be preassembled and then inserted into head 9*a*. Also core 57*a* can firstly be inserted in head 9*a* up to the abutted state before then inserting nozzle cap 5*a*.

It will be appreciated that all features, properties and effects cited may be precisely or merely substantially or roughly so as explained and may also greatly depart therefrom depending on individual requirements. All parts of the device may be made of plastics material, more particularly of injection molded plastics.

We claim:

1. A dispenser for discharging media comprising:

a first pump unit (3) including a first pump casing (15) with an outermost downstream casing end (17) and a central innermost casing chamber (28) traversing said outermost downstream casing end (17) by a passage section (32);

a support face (20) in one part with said outermost downstream casing end (17) for axial support on a medium reservoir (2);

a second pump (4) for conveying a second medium and including a pressure chamber (50), a stationary and a movable pump body (49, 52) for volumetrically varying said pressure chamber (40), said stationary pump body (49) being provided on an assembly body (7) separate from said support face (20);

holding means (40) axially substantially firmly seating said stationary pump body (49) relative to said first pump casing (15);

a fixing member (8) for axially tensioning said support face (20) against the medium reservoir (2);

an actuator head (9) displaceable relative to said support face (20) over a pump stroke from an initial position to an end position, and an actuating tappet (33) displaceable with said actuator head (9) and directly bounding said passage section (32) within said outermost downstream casing end (17), said assembly body (7, 7*a*, 7*b*) externally enveloping said central innermost casing chamber (28).

2. The dispenser according to claim 1, wherein said holding means (40, 40*a*) include interengaging holding members (21, 46 or 46*a*, 70; 71, 72) including a first holder (21 or 70, 72) and a second holder (46 or 46*a*, 71), said first holder being in one part with said outermost downstream casing end (17) and said second holder being in one part with said assembly body (7, 7*a*), said holding members being located entirely outside said innermost casing chamber (28).

3. The dispenser according to claim 2, wherein said holding members interengage pretensioned, said holding means (40, 40*a*, 40*b*) providing at least one sealing point environmentally sealing said innermost casing chamber (28).

4. The dispenser according to claim 1, wherein said holding means (40, 40*a*, 40*b*) include a depression (70, 72) and a projection (46, 46*a*, 71) engaging inside said depression.

5. The dispenser according to claim 4, wherein said projection is annularly closed, said projection including a web of said assembly body (7, 7*a*).

6. The dispenser according to claim 1, wherein said assembly body (7, 7*a*, 7*b*) is at least as long as said pump stroke.

7. The dispenser according to claim 1, wherein said first pump casing (15) includes an annular end wall (21, 21*a*) in one part with said outermost downstream casing end (17), said end wall including said support face (20) and an end side remote from said support face, commonly with said assembly body (7, 7*a*, 7*b*) said end side providing said holding means (40, 40*a*, 40*b*), said assembly body (7, 7*a*, 7*b*) externally circumferentially enveloping said annular end wall (21, 21*a*).

8. The dispenser according to claim 1, wherein said assembly body (7, 7*a*) includes an end wall (48, 48*a*) separate from said first pump casing (15) and said support face (20), a support projection (45, 47*a*) jutting from said end wall (48, 48*a*) downstrean, said support projection bearing said stationary pump body (49, 49*a*) stationary relative to said assembly body (7).

9. The dispenser according to claim 8, wherein said stationary pump body (49, 49*a*) is in one part with at least one of said support projection, and said end wall (48, 48*a*).

10. The dispenser according to claim 1, wherein when assembled with the medium reservoir (2) said assembly body (7, 7*a*) envelopes the medium reservoir (2) and protrudes into said actuator head (9), said first pump casing (15), said support face (20) and said actuating tappet (33) of said movable pump body (52) being located inside said assembly body (7, 7*a*, 7*b*).

11. The dispenser according to claim 1, wherein said assembly body (7, 7*a*, 7*b*) axially opposingly projects over said holding means (40, 40*a*, 40*b*).

12. The dispenser according to claim 1, wherein means (60, 60*a*) are provided for positively preventing withdrawal of said actuator head (9, 9*a*) from said movable pump body (52), said prevention means including said assembly body (7, 7*a*, 7*b*).

13. The dispenser according to claim 1, wherein said assembly body (7, 7*a*, 7*b*) includes means for abutting said actuator head (9, 9*a*) in at least one of said initial position and said end position, said abutting means (60, 60*a*, 60*b*) including snap members resiliently disengageable.

14. The dispenser according to claim 1, wherein said assembly body (7) is at least partly in one part with said fixing member.

15. The dispenser according to claim 1, wherein said pressure chamber (50) directly connects to said actuating tappet (33) and envelopes said first pump casing (15), said fixing member (8) and the medium reservoir (2).

16. The dispenser according to claim 1, wherein a bellows (65) is provided, said bellows being flexible for sealing said pressure chamber (50) around said stationary pump body (49) including a displacer piston, said bellows (65) including annular flanges (66) sealingly connecting to said assembly body (7) and said actuator head (9).

17. The dispenser according to claim 1, wherein said assembly body (7) includes a sleeve (45) including an inner sleeve circumference, said inner sleeve circumference directly supporting against the reservoir (2) at a support point, adjacent to and downstream of said support point said inner sleeve circumference providing said holding means (40).

18. The dispenser according to claim 1, wherein said first pump casing (15) directly connects to said pressure chamber (50).

19. The dispenser according to claim 1, wherein said assembly body (7) supports a protecting jacket (61) externally enveloping said actuator head (9) and said pressure chamber (50).

20. The dispenser according to claim 1, wherein a venting duct is provided and traverses said first pump casing (15) from said pressure chamber (50) up to and into the medium reservoir.

21. The dispenser according to claim 20, wherein inside said first pump casing (15) said venting duct is bounded by said actuating tappet (33) and issues into the medium reservoir (2), downstream of said support face, a venting valve (37) being included and closing said venting duct when said initial position is achieved.

22. The dispenser according to claim 1, wherein said assembly body (7*a*) includes a cover cap (48*a*, 69), said fixing member (8*a*) including a fixing cap located inside said cover cap and attached to said cover cap with said holding means (40*a*).

23. The dispenser according to claim 1, wherein said fixing member (8*a*) and said outermost downstream casing end (17*a*) of said first pump casing (15*a*) are in one part.

24. The dispenser according to claim 1, wherein said assembly body (7, 7*a*) and said stationary pump body (49, 49*a*) are made in one part extending up to said holding means (40, 40*a*).

25. The dispenser according to claim 1, wherein said actuator head (9) includes a mixing nozzle including a mixing chamber (58, 58*a*), separate first and second connecting ducts (54, 59 or 54*a*, 59*a*) being included and separately connecting said mixing chamber (58, 58*a*) with said first pump unit (3) and said pressure chamber (50, 50*a*).

26. The dispenser according to claim 25, wherein an atomizer nozzle (75) is included and issues into said mixing chamber (58*a*) to connect said mixing chamber with said first pumping unit (3*a*), said mixing chamber including a swirl chamber porting directly into a second atomizer nozzle at which the medium emerges from said dispenser (1*a*).

27. The dispenser according to claim 1 and further including a medium outlet (14, 14*a*) where the media are released from said dispenser (1, 1*a*), wherein means are provided for aspirating into said second pump (4) substantially exclusively through said media outlet.

28. The dispenser according to claim 1 and further including an outlet nozzle (14*a*) where the media are released from said dispenser (la), wherein said outlet nozzle includes a first nozzle body (55*a*) and a second nozzle body (57*a*), said first and second nozzle bodies including a first impact face (74) and a second impact face axially spaced from said first impact face.

29. The dispenser according to claim 28, wherein at least one connecting duct (75) is included and connects said first impact face (74) with said second impact face axially spaced from said at least one connecting duct (75), said first nozzle body (55*a*) including a nozzle cap including an end wall, said end wall providing said second impact face and being traversed by a nozzle duct (56) ending in a final discharge orifice of said dispenser (1*a*).

* * * * *